(12) United States Patent
Bett et al.

(10) Patent No.: US 11,467,755 B2
(45) Date of Patent: Oct. 11, 2022

(54) METHOD AND SYSTEM FOR ENABLING AGENTLESS BACKUP AND RESTORE OPERATIONS ON A CONTAINER ORCHESTRATION PLATFORM

(71) Applicant: EMC IP Holding Company LLC, Hopkinton, MA (US)

(72) Inventors: Antony Bett, Shrewsbury, MA (US); Assaf Natanzon, Tel Aviv (IL); Luay Al-Alem, Lynnfield, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 36 days.

(21) Appl. No.: 17/060,920

(22) Filed: Oct. 1, 2020

(65) Prior Publication Data

US 2021/0019055 A1 Jan. 21, 2021

Related U.S. Application Data

(63) Continuation of application No. 16/259,504, filed on Jan. 28, 2019, now Pat. No. 10,831,399.

(51) Int. Cl.
*G06F 3/06* (2006.01)
*G06F 9/455* (2018.01)
*G06F 9/48* (2006.01)

(52) U.S. Cl.
CPC .............. *G06F 3/065* (2013.01); *G06F 3/067* (2013.01); *G06F 3/0619* (2013.01); *G06F 9/455* (2013.01); *G06F 9/4881* (2013.01)

(58) Field of Classification Search
CPC ........ G06F 3/065; G06F 3/0619; G06F 3/067; G06F 9/455; G06F 9/4884
See application file for complete search history.

(56) References Cited

U.S. PATENT DOCUMENTS

| | | | |
|---|---|---|---|
| 9,256,467 B1* | 2/2016 | Singh | G06F 9/45558 |
| 9,858,154 B1* | 1/2018 | Lyadvinsky | G06F 11/1469 |
| 10,515,005 B1* | 12/2019 | Burrell | G06F 11/368 |
| 2018/0270124 A1* | 9/2018 | Chugtu | G06F 9/541 |
| 2018/0314598 A1* | 11/2018 | Nanivadekar | G06F 11/1451 |
| 2019/0065323 A1* | 2/2019 | Dhamdhere | G06F 11/3452 |
| 2019/0173840 A1* | 6/2019 | Desai | H04L 63/0281 |
| 2019/0179918 A1* | 6/2019 | Singh | G06F 11/1458 |
| 2019/0303274 A1* | 10/2019 | Funnell | G06F 16/7837 |

\* cited by examiner

*Primary Examiner* — Nanci N Wong
(74) *Attorney, Agent, or Firm* — Chamberlain, Hrdlicka, White, Williams & Aughtry (57) ABSTRACT

A method and system for enabling agentless backup and restore operations on a container orchestration platform. Specifically, the method and system disclosed herein may entail facilitating the implementation of backup (or restore) workloads in a containerized environment without the co-execution of secondary storage agents therein, which traditionally manage these backup (or restore) operations.

16 Claims, 9 Drawing Sheets

METHOD AND SYSTEM FOR ENABLING AGENTLESS BACKUP AND RESTORE OPERATIONS ON A CONTAINER ORCHESTRATION PLATFORM

BACKGROUND

With most existing data protection (or backup storage) systems, the installation and execution of a system-affiliated agent, alongside a given stateful application sought for backup or restoration, is required. However, system-affiliated agents are not necessary suitable in containerized environments.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-8, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the phrase 'operatively connected' may be used to describe a connection between components. As used hereinafter, the aforementioned phrase may refer to any direct (e.g., wired directly between two or more components) or indirect (e.g., wired and/or wireless connections between any number of components connection the operatively connected components) connection.

In general, embodiments of the invention relate to a method and system for enabling agentless backup and restore operations on a container orchestration platform. Specifically, one or more embodiments of the invention may entail facilitating the implementation of backup (or restore) workloads in a containerized environment without the co-execution of secondary storage agents therein, which traditionally manage these backup (or restore) operations.

With most existing data protection (or backup storage) systems, the installation and execution of a system-affiliated agent, alongside a given stateful application sought for backup or restoration, is required. The system-affiliated agent may represent a computer program that may include functionality to: register with their affiliated data protection (or backup storage) system; establish and maintain an interface between the given stateful application and their affiliated data protection (or backup storage) system; and facilitate the backup and/or restore operations involving data and/or state pertinent to the stateful application. Further, when considering the execution of the given stateful application using virtual machines, which tend to exhibit long lifespans (e.g., weeks or months), the required co-execution of the system-affiliated agent alongside the stateful application is not a difficult imposition. On the other hand, containers are generally ephemeral in nature, meaning any given container may lead a very short existence or lifespan (e.g., less than an hour), and accordingly, may be spun up and deleted on-demand as necessary. Because of this nature, containers may still meet the requirements for executing stateful applications, however, are often unsuitable for the execution of backup and/or restore operations, by way of system-affiliated agents, therein. Embodiments of the invention, therefore, implement a backup and/or restore service that enables agentless backup and/or restore operations for persisting stateful application data and/or state. Further, one or more embodiments of the invention may eliminate application-to-agent compatibility issues, as well as reduce the drainage of compute resources (e.g., computer processors, memory, input-output throughout, network bandwidth, etc.), which are known to compromise system performance.

Figure 1:
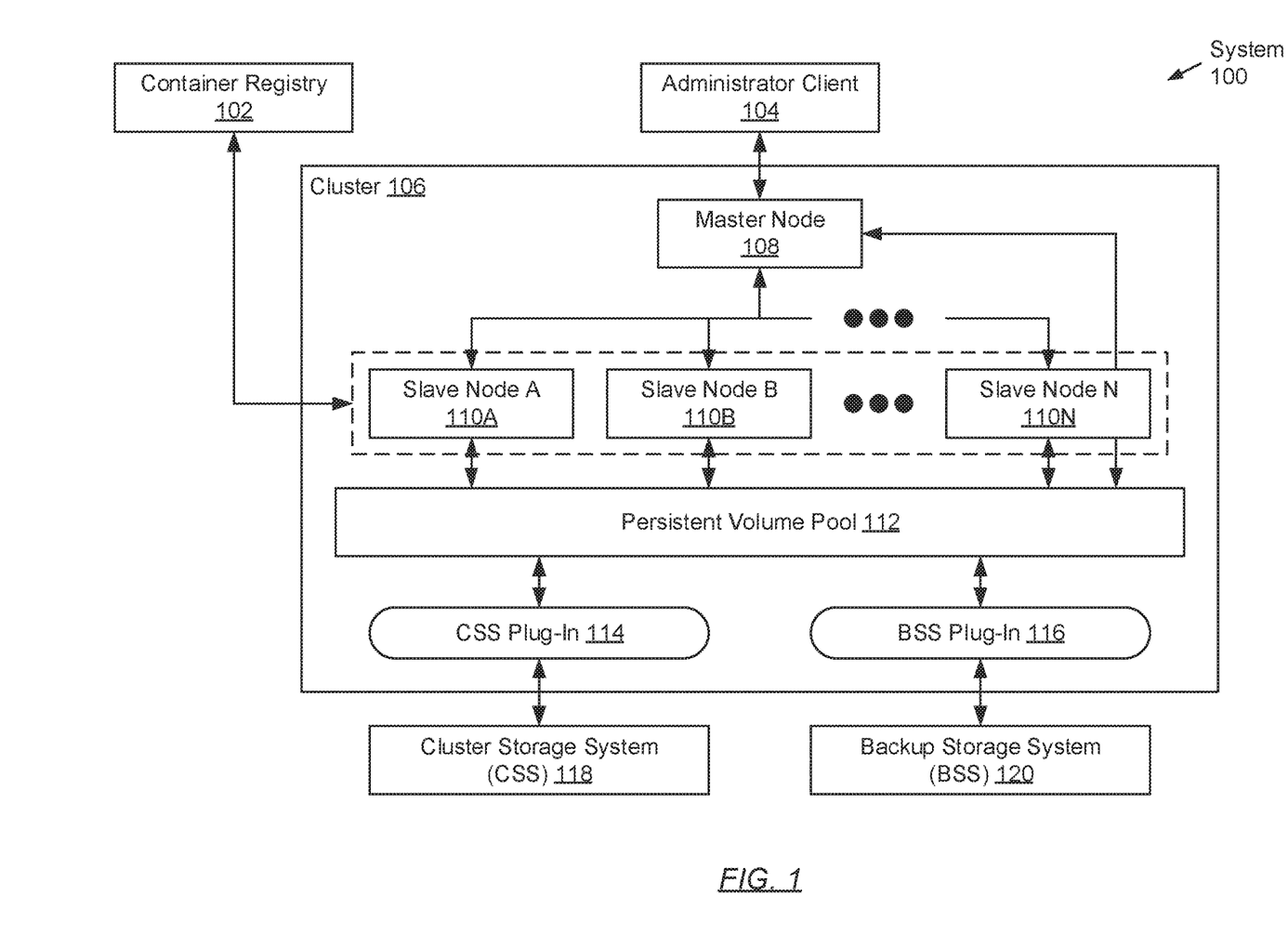
FIG. 1 shows a system in accordance with one or more embodiments of the invention.

FIG. 1 shows a system in accordance with one or more embodiments of the invention. The system (100) may include a cluster (106) operatively connected to a container registry (102), an administrator client (104), a cluster storage system (CSS) (118), and a backup storage system (BSS) (120). Each of these system (100) components is described below.

In one embodiment of the invention, the above-mentioned components may be directly or indirectly connected to one another through a network (not shown) (e.g., a local area network (LAN), a wide area network (WAN) such as the Internet, a mobile network, etc.). The network may be implemented using any combination of wired and/or wireless connections. In embodiments in which the above-mentioned components are indirectly connected, there may be other networking components or systems (e.g., switches, routers, gateways, etc.) that may facilitate communications, information exchange, and/or resource sharing. Further, the above-mentioned components may interact with one another using any combination of wired and/or wireless communication protocols.

In one embodiment of the invention, the cluster (106) may represent a container orchestration system. A container (not shown) may refer to a standalone, lightweight virtualization environment that allows for the running of an application or an operating system, within the container, without the overhead of executing a hypervisor (i.e., a computer program dedicated to the management of virtualization objects such as virtual machines) over the underlying hardware of the container host (e.g., any physical computing system (see e.g., FIG. 8)). A container orchestration system, on the other hand, may refer to a container lifecycle management platform, which may include functionality to manage multi-container workloads deployed across a cluster of computing nodes. Examples of a container orchestration system may include, but are not limited to, Docker Swarm, Google Kubernetes, and Apache Mesos.

In one embodiment of the invention, the cluster (106) may include a master node (108) operatively connected to one or more slave nodes (110A-110N), a persistent volume pool (112), a CSS plug-in (114), and a BSS plug-in (116). Each of these cluster (106) subcomponents is described below.

In one embodiment of the invention, the master node (108) may represent a physical computing system dedicated to the management of the cluster (106)—i.e., the container orchestration system. To that extent, the master node (108) may include, but is not limited to, the following functionalities: receiving workload (i.e., job) requests; deploying workloads, representative of received workload requests, across one or more slave nodes (110A-110N); reconciling actual cluster (106) state with a desired cluster (106) state; receiving and processing volume creation requests to generate persistent volumes (described below) (see e.g., FIG. 4); and performing analytics pertinent to the cluster (106). One of ordinary skill will appreciate that the master node (108) may perform other functionalities without departing from the scope of the invention. Examples of the master node (108) may include, but are not limited to, a desktop computer, a laptop computer, a tablet computer, a server, a mainframe, or any other computing system similar to the exemplary computing system shown in FIG. 8. The master node (108) is described in further detail below with respect to FIG. 2.

In one embodiment of the invention, a/each slave node (110A-110N) may represent a physical computing system dedicated to the execution of workloads presented to the cluster (106)—i.e., the container orchestration system. To that extent, a/each slave node (110A-110N) may include, but is not limited to, the following functionalities: receiving workloads deployed by the master node (108); implementing received workloads using one or more containers (described above); providing resources to support the execution of the container(s); monitoring and reporting container status(es); aggregating metrics and/or metadata pertinent to cluster (106) analytics; and substantively implementing agentless backup and restore operations in accordance with embodiments of the invention (see e.g., FIGS. 5A-7). One of ordinary skill will appreciate that a/each slave node (110A-110N) may perform other functionalities without departing from the scope of the invention. Examples of a/each slave node (110A-110N) may include, but are not limited to, a desktop computer, a laptop computer, a tablet computer, a server, a mainframe, or any other computing system similar to the exemplary computing system shown in FIG. 8. A/each slave node (110A-110N) is described in further detail below with respect to FIG. 3.

In one embodiment of the invention, the persistent volume pool (112) may represent a logical or virtual aggregation of storage capacity from which one or more persistent volumes (not shown) may be provisioned. A persistent volume may refer to a cluster (106) resource through which persistent (i.e., non-volatile) storage may be provided to containers implementing stateful workloads. A stateful workload may refer to an application that may include functionality to read (i.e., retrieve) and write (i.e., store) data and state from/to persistent disk storage. Database applications, which execute in a containerized environment, may be examples of stateful workloads. Further, the persistent volume pool (112) may be formed from one or more physical storage devices (not shown). These physical storage device(s) may, for example, reside in networked storage systems—e.g., the CSS (118) and/or the BSS (120)—operatively connected to and independent of the cluster (106).

In one embodiment of the invention, the CSS plug-in (114) may represent a computer program that facilitates interchange between the cluster (106) and the CSS (118). Specifically, the CSS plug-in (114) may represent a device driver or a device interface through which CSS (118) functions and resources may be invoked and accessed, respectively. To that extent, the CSS plug-in (114) may include, but is not limited to, the following functionalities: interfacing one or more persistent volumes (described above), provisioned from the persistent volume pool (112), with the CSS (118); and translating input-output (IO) (i.e., read and/or write) requests from the cluster (106) to the CSS (118). One of ordinary skill will appreciate that the CSS plug-in (114) may perform other functionalities without departing from the scope of the invention. Further, for the CSS plug-in (114) to execute across the cluster (106), at least each of the one or more slave nodes (110A-110N) may be required to have the CSS plug-in (114) installed and executing thereon.

In one embodiment of the invention, the BSS plug-in (116) may represent a computer program that facilitates interchange between the cluster (106) and the BSS (120). Specifically, the BSS plug-in (116) may represent a device driver or a device interface through which BSS (120) functions and resources may be invoked and accessed, respectively. To that extent, the BSS plug-in (116) may include, but is not limited to, the following functionalities: interfacing one or more persistent volumes (described above), provisioned from the persistent volume pool (112), with the BSS (120); and translating input-output (IO) (i.e., read and/or write) requests from the cluster (106) to the BSS (120). One of ordinary skill will appreciate that the BSS plug-in (116) may perform other functionalities without departing from the scope of the invention. Further, for the BSS plug-in (116) to execute across the cluster (106), at least each of the one or more slave nodes (110A-110N) may be required to have the BSS plug-in (116) installed and executing thereon.

In one embodiment of the invention, the container registry (102) may represent a storage service dedicated to consolidating container images. A container image may represent a foundation snapshot (e.g., a template), for a given workload or application type, from which deployed workloads, sought to be implemented, may be based. For example, should a data backup workload be deployed onto the cluster (106), an existing data backup container image may be retrieved from the container registry (102) and used as a template for implementing a containerized environment (i.e., a container) wherein a data backup application may execute. Accordingly, a container image may include all that which may be necessary to implement any given workload—e.g., relevant code and dependencies (e.g., system tools, system libraries and settings, etc.). Further, the container registry (102) may be implemented on one or more servers (not shown). Each server may be a physical server (i.e., residing within a datacenter) or a virtual server (i.e., residing in a cloud computing environment). Additionally or alternatively, the container registry (102) may be implemented on one or more other computing systems similar to the exemplary computing system shown in FIG. 8.

In one embodiment of the invention, the administrator client (104) may represent a physical computing system wherefrom cluster (106) operations may be overseen and workload requests, by users, may be issued. To that extent, the administrator client (104) may include, but is not limited to, the following functionalities: interfacing with the master node (108) of the cluster (106); configuring the cluster (106) via the master node (108); and issuing workload requests for the implementation of user-defined workloads on the cluster (106) via the master node (108). One of ordinary skill will appreciate that the administrator client (104) may perform other functionalities without departing from the scope of the invention. Examples of the administrator client (104) may include, but are not limited to, a desktop computer, a laptop computer, a tablet computer, a server, a mainframe, a smartphone, or any other computing system similar to the exemplary computing system shown in FIG. 8.

In one embodiment of the invention, the CSS (118) may represent a networked storage system dedicated to the consolidation of cluster (106) pertinent data—e.g., user and/or application data accessed by one or more containers. The CSS (118) may be implemented on one or more servers (not shown). Each server may be a physical server (i.e., residing within a datacenter) or a virtual server (i.e., residing in a cloud computing environment). Additionally or alternatively, the CSS (118) may be implemented on one or more other computing systems similar to the exemplary computing system shown in FIG. 8. Further, the CSS (118) may include one or more physical storage devices and/or media. The one or more physical storage devices and/or media may or may not be of the same type and/or may or may not be co-located at a same site. In one embodiment of the invention, the CSS (118) may include and provide persistent (i.e., non-volatile) data storage. Examples of persistent data storage include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the BSS (120) may represent a networked data backup, archiving, and/or disaster recovery storage system. The BSS (120) may be dedicated to the consolidation of backup copies (or snapshots) of cluster (106) pertinent data—e.g., backup copies of user and/or application data accessed by one or more containers. The BSS (120) may be implemented on one or more servers (not shown). Each server may be a physical server (i.e., residing within a datacenter) or a virtual server (i.e., residing in a cloud computing environment). Additionally or alternatively, the BSS (120) may be implemented on one or more other computing systems similar to the exemplary computing system shown in FIG. 8. Further, the BSS (120) may include one or more physical storage devices and/or media. The one or more physical storage devices and/or media may or may not be of the same type and/or may or may not be co-located at a same site. In one embodiment of the invention, the BSS (120) may include and provide persistent (i.e., non-volatile) data storage. Examples of persistent data storage include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

While FIG. 1 shows a configuration of components, other system configurations may be used without departing from the scope of the invention.

Figure 2:
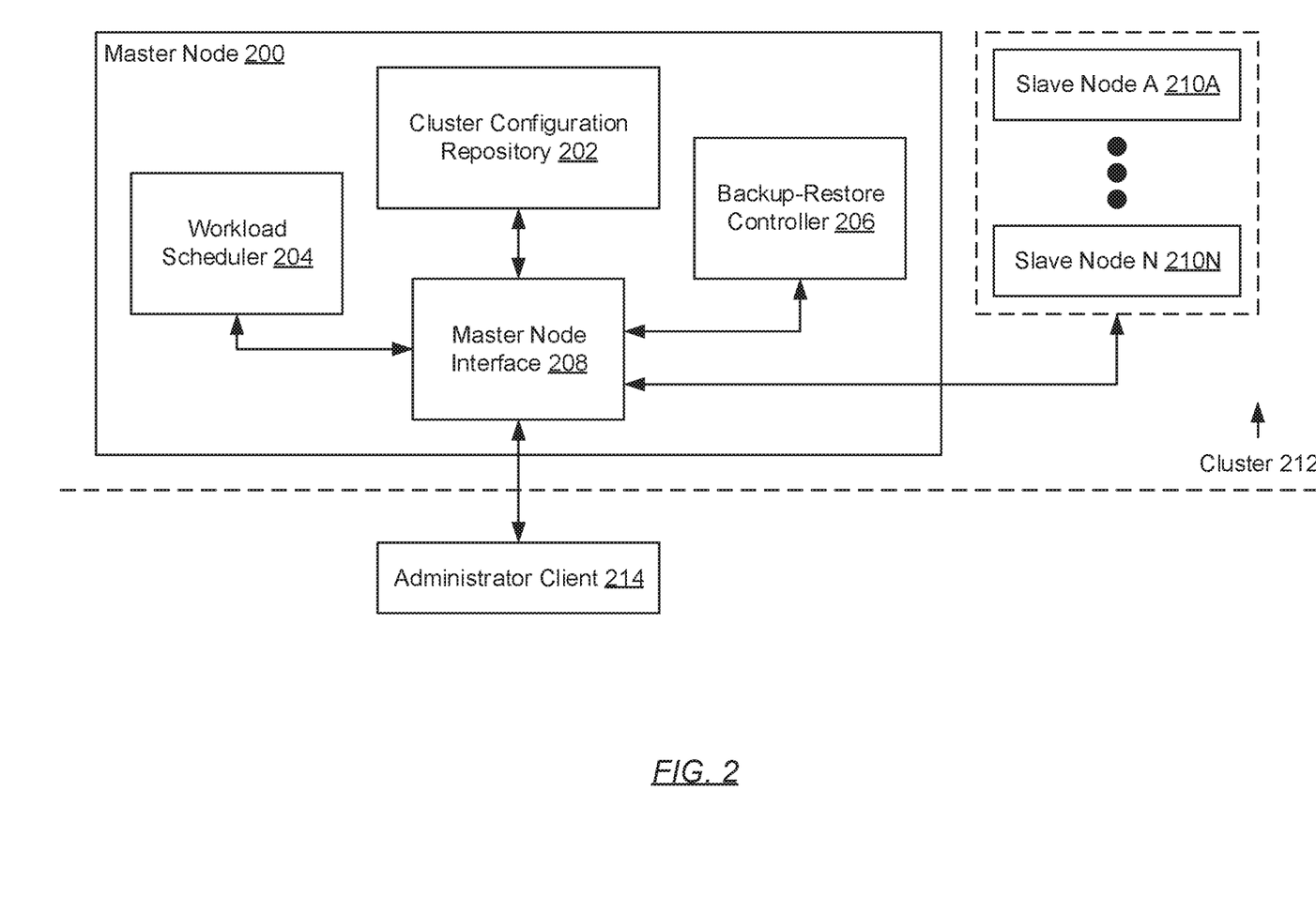
FIG. 2 shows a master node in accordance with one or more embodiments of the invention.

FIG. 2 shows a master node in accordance with one or more embodiments of the invention. The master node (200) may include a master node interface (208) operatively connected to a cluster configuration repository (202), a workload scheduler (204), and a backup-restore controller (206). Each of these master node (200) subcomponents is described below.

In one embodiment of the invention, the master node interface (208) may represent an application programming interface (API) for the cluster (212)—e.g., the container orchestration system. To that extent, the master node interface (208) may employ a set of subroutine definitions, protocols, and/or tools for enabling communications between the cluster (212) and external entities (e.g., the administrator client (214)). The master node interface (208) may also facilitate communications between the master node (200) and the one or more slave nodes (210A-210N) of the cluster (212). Furthermore, the master node interface (208) may include, but is not limited to, the following additional functionalities: maintaining and/or updating the cluster configuration repository (202); provisioning persistent volumes (described above) based on received volume creation requests; invoking the workload scheduler (204) (see e.g., FIG. 5A); deploying workloads to one or more slave nodes (210A-210N); and receiving and validating workload requests from external entities and/or the backup-restore controller (206). One of ordinary skill will appreciate that the master node interface (208) may perform other functionalities without departing from the scope of the invention.

In one embodiment of the invention, the cluster configuration repository (202) may represent a data store dedicated to the consolidation of cluster (212) configuration information. Cluster (212) configuration information may refer to data that details the state of the cluster (212) at any given point of time. By way of examples, cluster (212) configuration information may include, but is not limited to: information identifying the one or more slave nodes (210A-210N) that, at least in part, establish the cluster (212); information identifying the various workloads implemented and/or containers executing across the cluster (212); and information identifying which slave node(s) (210A-210N) may be hosting which workload(s) and/or container(s). Further, the cluster configuration repository (202) may be implemented using one or more physical storage devices and/or media representative of data storage on the master node (200). These one or more physical storage devices and/or media may or may not be of the same type. In one embodiment of the invention, the cluster configuration repository (202) may be implemented using persistent (i.e., non-volatile) data storage. Examples of persistent data storage include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the workload scheduler (204) may represent a computer program dedicated to binding (or assigning) workloads, sought to be implemented, to slave nodes (210A-210N) of the cluster (212). To that extent, the workload scheduler (204) may include, but is not limited to, the following functionalities: at the behest of the master node interface (208), obtain workload requirements therefrom, which pertain to workloads sought to be implemented; monitoring the availability of resources (e.g., computing, memory, storage, virtualization, etc.) on each of the one or more slave nodes (210A-210N); determining the appropriate slave node(s) (210A-210N) on which to deploy the workloads, sought to be implemented, based on the obtained workload requirements and the monitored availability of resources; and informing the master node interface (208) of the determined workload-to-slave node assignment. One of ordinary skill will appreciate that the workload scheduler (204) may perform other functionalities without departing from the scope of the invention.

In one embodiment of the invention, the backup-restore controller (206) may represent a computer program dedicated to the instantiation of agentless backup and/or restore operations across the cluster (212). To that extent, the backup-restore controller (206) may include, but is not limited to, the following functionalities: issuing backup (or restore) workload requests, to the master node interface (208), based on proactive (or reactive) disaster recovery programming; receiving backup (or restore) workload metadata following the implementation and completion of the backup (or restore) workload; and deriving analytics using at least the received backup (or restore) workload metadata. One of ordinary skill will appreciate that the backup-restore controller (206) may perform other functionalities without departing from the scope of the invention.

Figure 3:
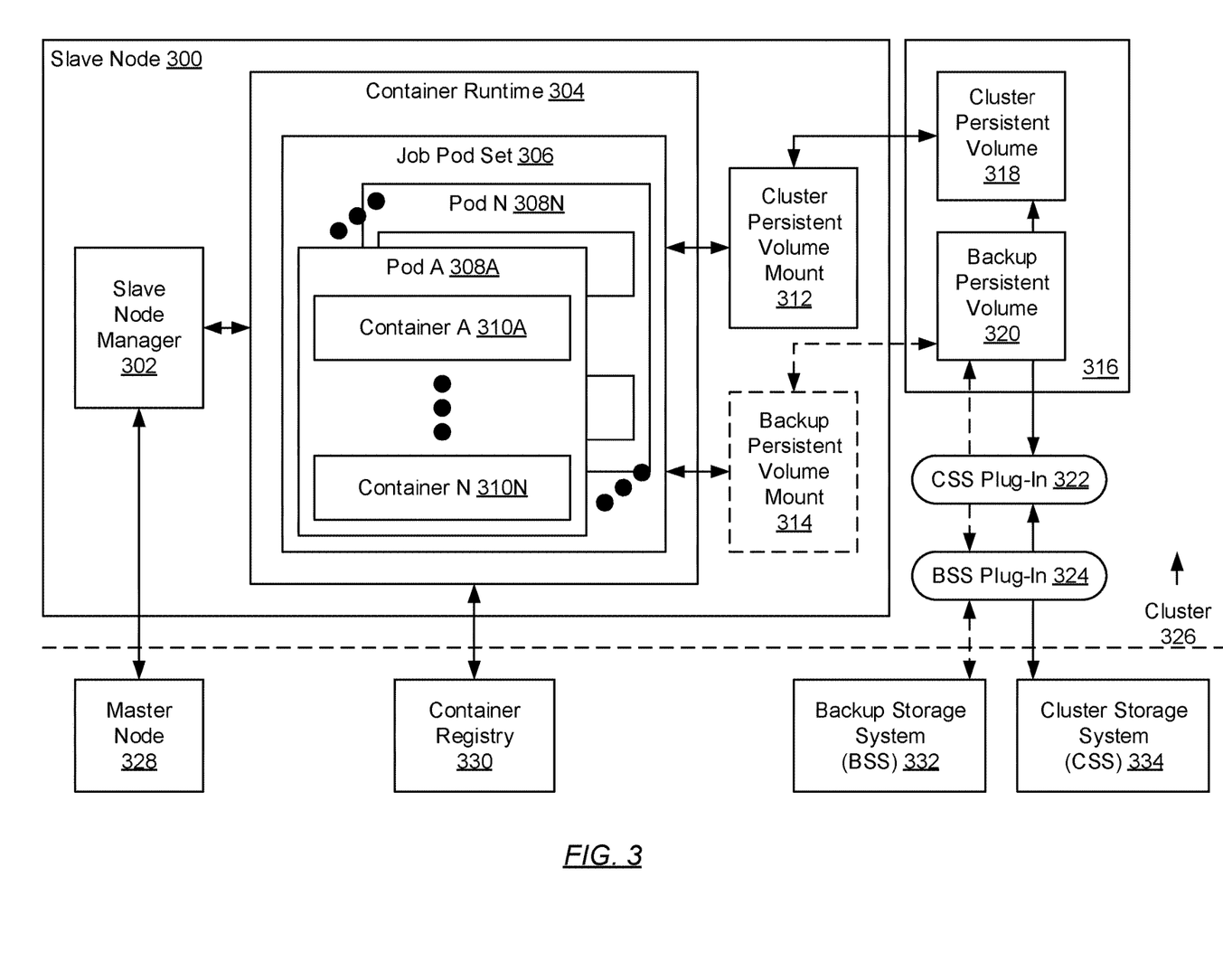
FIG. 3 shows a slave node in accordance with one or more embodiments of the invention.

FIG. 3 shows a slave node in accordance with one or more embodiments of the invention. The slave node (300) may include a slave node manager (302), a container runtime (304), a cluster persistent volume mount (312), and a backup persistent volume mount (314). Each of these slave node (300) subcomponents is described below.

In one embodiment of the invention, the slave node manager (302) may represent a computer program dedicated to the management of the slave node (300). To that extent, the slave node manager (302) may include, but is not limited to, the following functionalities: interacting with the master node (328) of the cluster (326)—e.g., receiving workloads sought for implementation, reporting slave node (300) pertinent state information, etc.; managing the lifecycle of persistent volume mounts (e.g., the cluster persistent volume mount (312) and the backup persistent volume mount (314)); and controlling and/or invoking the container runtime (304) to implement received workloads, sought for implementation, and aggregate workload metadata. One of ordinary skill will appreciate that the slave node manager (302) may perform other functionalities without departing from the scope of the invention.

In one embodiment of the invention, the container runtime (304) may represent a computer program dedicated to the implementation of workloads. To that extent, the container runtime (304) may include, but is not limited to, the following functionalities: at the behest of the slave node manager (302), obtain workloads sought for implementation therefrom; implementing obtained workloads through the lifecycle management of one or more job pod sets (306) (described below); allocating slave node (300) resources (e.g., computing, memory, storage, virtualization, etc.) to support the implementation of obtained workloads; issuing container image requests to the container registry (330) and receiving container images therefrom; reporting state information pertinent to one or more job pod sets (306) to the slave node manager (302); and aggregating workload metadata for the slave node manager (302). One of ordinary skill will appreciate that the container runtime (304) may perform other functionalities without departing from the scope of the invention.

In one embodiment of the invention, a job pod set (306) may refer to a logical collection of one or more pods (308A-308N), which may enact the implementation and completion of a given workload. That is, when a given workload is implemented, one or more pods (308A-308N) may be created to perform and ensure the successful completion of the task(s) associated with the given workload. The created pod(s) (308A-308N) may either execute these task(s) as a non-parallel (i.e., serial) process or as multiple parallel processes. As a non-parallel process, any single pod (308A-308N) may be instantiated and execute these task(s) at any given time. When the instantiated pod (308A-308N) fails, for any number of reasons, a new single pod (308A-308N) may be instantiated to assume execution of the task(s). Should this new single pod (308A-308N) also fail, another new single pod (308A-308N) may be instantiated to take its place, and so forth. This non-parallel processing of the task(s) continues until the task(s) associated with the given workload successfully completes. On the other hand, as a parallel process, any set of two or more pods (308A-308N) may be instantiated and execute the above-mentioned task(s) at any given time. Successful completion of the task(s) may be defined through a different metric— i.e., a specified number of successful completions by an equal specified number of pods (308A-308N). Each successful completion of the task(s) may be tracked until the specified number of successful completions is reached, where at that point, the parallel processing of the task(s) officially complete and terminate. When any given pod (308A-308N) fails, one or more new pods (308A-308N) may be instantiated in place of the failed pod (308A-308N).

In one embodiment of the invention, a pod (308A-308N) may refer to a logical collection of one or more containers (310A-310N) (described above). Whereas any given pod (308A-308N) may be directed to the execution of a given workload in entirety, any given container (310A-310N) of the given pod (308A-308N) may be directed to the execution of any subset of the required task(s) (i.e., processes or instances) associated with the given workload. By way of a simplified example, a workload may be defined through three different tasks (or processes)—e.g., a main process, which may handle the bulk of the workload, and two assistant processes, which may focus on the performance of minor responsibilities. Subsequently, in one embodiment of the invention, a first container may be instantiated to execute the main process, while a second container may be instantiated to execute the two assistant processes. In another embodiment of the invention, three separate containers may be instantiated to execute each different task (or process), respectively. Further, any given container (310A-310N), like any given pod (308A-308N), may fail for any number of reasons. When a failure transpires, another new container (310A-310N) may be instantiated to assume the subset of tasks (or processes) for which the failed container (310A-310N) had been responsible.

In one embodiment of the invention, the cluster persistent volume mount (312) may represent a logically or virtually abstracted object that serves as an interface to a given cluster persistent volume (318), which may have been provisioned from the persistent volume pool (316) (described above) of the cluster (326) (see e.g., FIG. 1). In turn, a cluster persistent volume (318) may represent a persistent volume (described above) that is backed by, or interfaces with, the cluster storage system (CSS) (334). Interfacing between the cluster persistent volume (318) and the CSS (334) may be managed by the CSS plug-in (322). Further, the cluster persistent volume mount (312) may point to a specific directory (or set of directories) representative of disk location(s) on the CSS (334) whereat relevant data, to one or more job pod sets (306), may reside. In addition, though one cluster persistent volume mount (312) is shown, multiple cluster persistent volume mounts (312) may be instantiated on the slave node (300). In such a scenario, each cluster persistent volume mount (312) may point to a different subset of directories on the CSS (334), which may be accessed by any one job pod set (306) or multiple job pod sets (306).

In one embodiment of the invention, the backup persistent volume mount (314) may represent a logically or virtually abstracted object that serves as an interface to a given backup persistent volume (320), which may have been provisioned from the persistent volume pool (316) (described above) of the cluster (326) (see e.g., FIG. 1). In turn, a backup persistent volume (320) may represent a persistent volume (described above) that is backed by, or interfaces with, the backup storage system (BSS) (332). Interfacing between the backup persistent volume (320) and the BSS (332) may be managed by the BSS plug-in (324). Further, the backup persistent volume mount (314) may point to a specific directory (or set of directories) representative of disk location(s) on the BSS (332) whereat relevant data, to one or more job pod sets (306), may reside. In addition, though one backup persistent volume mount (314) is shown, multiple backup persistent volume mounts (314) may be instantiated on the slave node (300). In such a scenario, each backup persistent volume mount (314) may point to a different subset of directories on the BSS (332), which may be accessed by any one job pod set (306) or multiple job pod sets (306).

Figure 4:
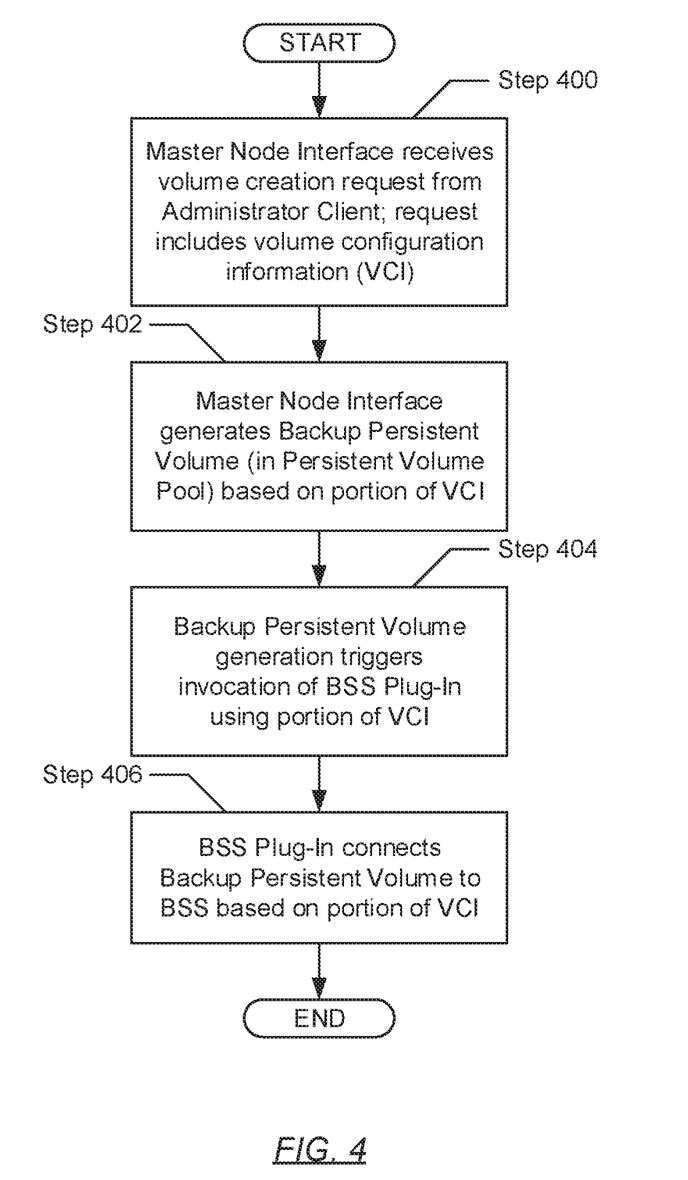
FIG. 4 shows a flowchart describing a method for processing a volume creation request in accordance with one or more embodiments of the invention.

FIG. 4 shows a flowchart describing a method for processing a volume creation request in accordance with one or more embodiments of the invention. The various steps outlined below may be performed by a master node in conjunction with a backup storage system (BSS) plug-in of a cluster (see e.g., FIG. 1). Further, while the various steps in the flowchart are presented and described sequentially, one of ordinary skill will appreciate that some or all steps may be executed in different orders, may be combined or omitted, and some or all steps may be executed in parallel. Moreover, in one embodiment of the invention, the various steps outlined below may be contingent on the BSS plug-in being installed across the cluster beforehand.

Turning to FIG. 4, in Step 400, a master node interface of the master node (see e.g., FIG. 2) receives a volume creation request. In one embodiment of the invention, the volume creation request may pertain to the provision of a persistent volume (described above), and may have been submitted by an administrator client. Further, the volume creation request may include volume configuration information (VCI). Collectively, VCI may detail the attribute requirements for the to-be-provisioned persistent volume. These attribute requirements may include, but are not limited to: a storage size (or capacity), an access mode (e.g., read-only accessibility by a single slave node, read-only accessibility by multiple slave nodes, read-write accessibility by a single slave node, or read-write accessibility by multiple slave nodes); an identifier unique to the to-be-provisioned persistent volume; a set of performance requirements (e.g., latency, input-output operations per second (IOPS), throughput, etc.); and a backend reference associated with a physical storage system with which the to-be-provisioned persistent volume should interface.

In Step 402, the master node interface generates or provisions a backup persistent volume in response to receiving the volume creation request (in Step 400). Specifically, in one embodiment of the invention, the backup persistent volume may be provisioned from a persistent volume pool—i.e., a logical or virtual aggregation of physical storage capacity—based on at least a portion of the obtained VCI. The VCI subset which may be relevant to the provisioning of the backup persistent volume may include, but is not limited to: the storage size (or capacity), the access mode, and the unique identifier.

In Step 404, the provisioning of the backup persistent volume (in Step 402) subsequently triggers the invocation of the BSS plug-in. In one embodiment of the invention, the invocation of the BSS plug-in, versus any other storage plug-in, may at least be based on the backend reference specified in the VCI (obtained in Step 400). Further, the invocation of the BSS plug-in may entail: waking the BSS plug-in; and passing at least a portion of the VCI to the BSS plug-in. The VCI subset which may be relevant to the operations of the BSS plug-in may include, but is not limited to: the set of performance requirements.

In Step 406, following its invocation, the BSS plug-in connects (or interfaces) the backup persistent volume (provisioned in Step 402) to the physical storage system with which it is associated—i.e., the BSS (see e.g., FIG. 1). Particularly, in one embodiment of the invention, and in interfacing the backup persistent volume with the BSS, the BSS plug-in may: establish a network-enabled connection with the BSS; identify a partition of the BSS that meets the set of performance requirements; and link the backup persistent volume to the identified BSS partition. The aforementioned BSS partition may represent a physical storage device and/or media, of the various physical storage devices and/or media providing data storage on the BSS, which may exhibit attributes that match or exceed the desired set of performance requirements.

Figure 5A:
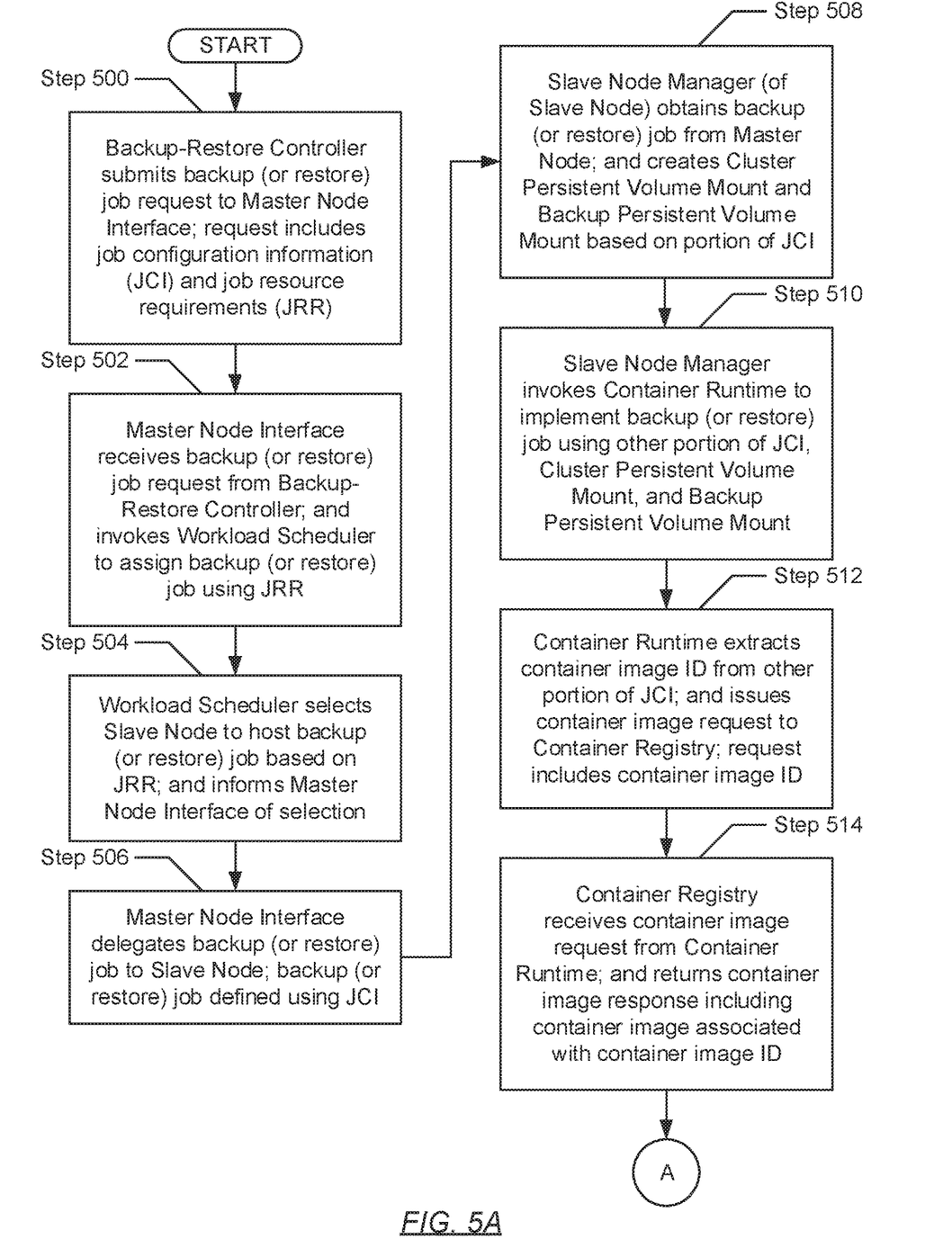
FIGS. 5A and 5B show flowcharts describing a method for processing a backup or restore job request in accordance with one or more embodiments of the invention.
Figure 5B:
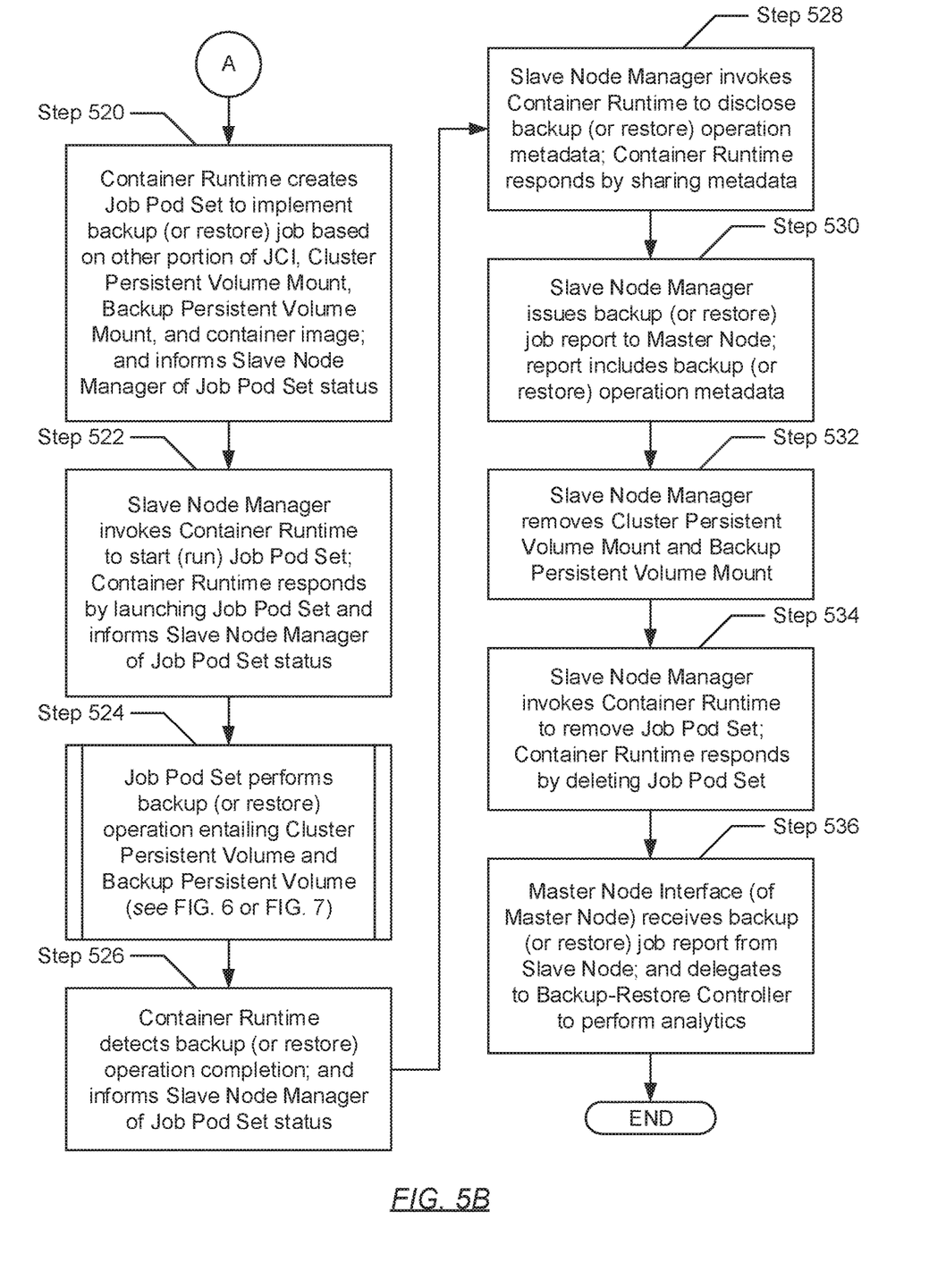

FIGS. 5A and 5B show flowcharts describing a method for processing a backup or restore job request in accordance with one or more embodiments of the invention. The various steps outlined below may be performed by a master node in conjunction with a slave node of a cluster (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 5A, in Step 500, a backup-restore controller of the master node (see e.g., FIG. 2) generates and submits a backup (or restore) job request. In one embodiment of the invention, the backup (or restore) job request may pertain to an agentless backup (or restore) operation (i.e., workload) sought to be implemented, and may be directed to a master node interface of the master node (see e.g., FIG. 2). An agentless backup (or restore) operation may entail the backup (or recovery) of data and/or state, pertinent to a stateful application executing within one or more containers, onto (or from) a backup storage system (BSS) (see e.g., FIG. 1) without the presence of a BSS-affiliated agent also executing within the container(s). A stateful application may refer to an application (or computer program) that may require the persistence of data and/or state, whereas a stateless application, in contrast, may refer to an application (or computer program) that is not concerned with the persistence of data and/or state.

Furthermore, in one embodiment of the invention, the backup (or restore) job request may include job configuration information (JCI) and job resource requirements (JRR). Collectively, JCI may detail implementation parameters for the workload sought to be implemented. These implementation parameters may include, but are not limited to: a job type (e.g., non-parallel processing versus parallel processing (described above) (see e.g., FIG. 3)); a container image identifier (ID) for a container image (described above) (see e.g., FIG. 1) from which one or more containers—to be instantiated for the execution of the backup (or restore) job—may be based; a backup persistent volume ID associated with a provisioned backup persistent volume; a backup persistent volume mount path identifying a directory (or multiple directories), of the provisioned backup persistent volume, whereat backup copies of stateful application data and/or state may be stored therein or recovered therefrom; a cluster persistent volume ID associated with a provisioned cluster persistent volume; and a cluster persistent volume mount path identifying a directory (or multiple directories), of the provisioned cluster persistent volume, whereat stateful application data and/or state may be read therefrom during backup operations, or may be written thereto during restore operations. Meanwhile, the JRR may detail a minimum threshold of various node resources needed to support the implementation of the workload sought to be implemented. These node resources may include, but are not limited to: computer processors, which may be allocated in base units of computer processor cores; and memory, which may be allocated in base units of bytes.

In Step 502, upon receiving the backup (or restore) job request from the backup-restore controller, the master node interface of the master node (see e.g., FIG. 2) invokes the workload scheduler, also of the master node. In one embodiment of the invention, the workload scheduler may represent a computer program dedicated to binding or assigning workloads (e.g., a backup (or restore) operation workload), sought to be implemented, to slave nodes of the cluster. Further, invocation of the workload scheduler may entail: waking the workload scheduler; and passing at least the JRR (received with the backup (or restore) job request) to the workload scheduler.

In Step 504, in response to being invoked, the workload scheduler selects a slave node deemed most appropriate, at the given time, to host the agentless backup (or restore) operation workload sought to be implemented. In one embodiment of the invention, the workload scheduler may achieve the selection based on a best-fit determination involving the JRR, for the agentless backup (or restore) operation workload, and real-time monitoring of available node resources on each and every slave node of the cluster. Afterwards, the workload scheduler may inform the master node interface of the selection—e.g., through the submission of a slave node identifier (ID) unique to the selected slave node.

In Step 506, upon being informed of the slave node selection, the master node interface delegates (or deploys) the agentless backup (or restore) operation workload, sought to be implemented, to the slave node (selected by the workload scheduler in Step 504). In one embodiment of the invention, deployment of the agentless backup (or restore) operation workload, to the aforementioned slave node, may substantively entail providing the slave node with the JCI (obtained via the backup (or restore) job request in Step 502).

In Step 508, a slave node manager of the selected slave node (see e.g., FIG. 3) receives the deployed agentless backup (or restore) operation workload from the master node interface. Upon receipt of the agentless backup (or restore) operation workload, in one embodiment of the invention, the slave node manager may create a cluster persistent volume mount and a backup persistent volume mount, on the selected slave node, based on at least a portion of the obtained JCI. The JCI subset which may be relevant to the creation of the cluster and backup persistent volume mounts may include, but is not limited to: the cluster persistent volume ID associated with a provisioned cluster persistent volume; the cluster persistent volume mount path identifying a directory (or multiple directories), of the provisioned cluster persistent volume, whereat stateful application data and/or state may be read therefrom during backup operations, or may be written thereto during restore operations; the backup persistent volume ID associated with a provisioned backup persistent volume; and the backup persistent volume mount path identifying a directory (or multiple directories), of the provisioned backup persistent volume, whereat backup copies of stateful application data and/or state may be stored therein or recovered therefrom.

In Step 510, the slave node manager subsequently invokes a container runtime of the selected slave node (see e.g., FIG. 3) to implement the agentless backup (or restore) operation workload (obtained in Step 508). In one embodiment of the invention, the container runtime may represent a computer program dedicated to the implementation of workloads—e.g., the agentless backup (or restore) operation workload. Further, invocation of the container runtime to implement the agentless backup (or restore) operation workload may entail: waking the container runtime; and passing at least a portion of the JCI, as well as references to the cluster and backup persistent volume mounts (created in Step 508), to the container runtime. The JCI subset which may be relevant to the implementation of the agentless backup (or restore) operation workload, by the container runtime, may include, but is not limited to: the job type (e.g., non-parallel processing versus parallel processing (described above) (see e.g., FIG. 3)); and the container image ID for a container image (described above) (see e.g., FIG. 1) from which one or more containers—to be instantiated for the implementation of the backup (or restore) operation workload—may be based.

In Step 512, in response to being invoked, the container runtime issues a container image request to a container registry (see e.g., FIG. 1). In one embodiment of the invention, the container registry may represent a storage service dedicated to consolidating container images. Accordingly, the container image request may pertain to obtaining a base (or template) container image pertinent to the implementation of the agentless backup (or restore) operation workload. Further, the container image request may at least include the container image ID specified in the JCI subset (passed to the container runtime in Step 510).

In Step 514, upon receiving the container image request from the container runtime, the container registry identifies the above-mentioned base (or template) container image using the enclosed container image ID. Subsequently, in one embodiment of the invention, the container registry may issue a container image response representative of a reply to the received container image request, and directed back to the container runtime. The container image response may include the base (or template) container image identified earlier. Moreover, the identified base (or template) container image may specify all that which may be necessary to implement agentless backup (or restore) operation workload—e.g., relevant code and dependencies (e.g., system tools, system libraries and settings, etc.). Hereinafter, the process proceeds to Step 520 (see e.g., FIG. 5B).

Turning to FIG. 5B, in Step 520, following the receipt of the container image response from the container registry, the container runtime instantiates a job pod set (see e.g., FIG. 3). In one embodiment of the invention, the job pod set may refer to a logical collection of one or more pods, which may enact the implementation and completion of a given workload—e.g., the agentless backup (or restore) operation workload. Further, instantiation of the job pod set may entail, but is not limited to: configuring the job pod set using the base (or template) container image (received by way of the container image response) and the job type (e.g., non-parallel processing versus parallel processing (described above) (see e.g., FIG. 3)) from the JCI subset (passed along with the invocation of the container runtime in Step 510); interfacing the job pod set with the provisioned cluster persistent volume using the cluster persistent volume mount (created by the slave node manager in Step 508); and interfacing the job pod set with the provisioned backup persistent volume using the backup persistent volume mount (also created by the slave node manager in Step 508). Thereafter, once the job pod set is instantiated, the container runtime informs the slave node manager of the job pod set status—i.e., a pending status, which may reflect the successful creation of the job pod set, but also reflective that the job pod set is not actively running (or executing).

In Step 522, in response to being informed of the job pod set status (instantiated by the container runtime in Step 520), the slave node manager invokes the container runtime to start (or run) the instantiated job pod set. Thereafter, upon being invoked once again, the container runtime responds by launching (or executing) the instantiated job pod set, and subsequently, re-informs the slave node manager of the new job pod status—i.e., a running status, which may reflect that the job pod set is actively executing, thereby carrying out the task(s) associated with the agentless backup (or restore) operation workload.

In Step 524, throughout its execution, the job pod set performs the task(s) (or process(es)) associated with the agentless backup (or restore) operation workload. In one embodiment of the invention, performance of the task(s) may entail interfacing with the cluster and backup persistent volumes via the cluster and backup persistent volume mounts, respectively. The task(s) outlined for the performance of an agentless backup operation, involving stateful application data and/or state, is described in further below with respect to FIG. 6. Alternatively, the task(s) outlined for the performance of an agentless restore operation, involving stateful application data and/or state, is described in further detail below with respect to FIG. 7.

In Step 526, based on a termination of the job pod set following its execution, the container runtime detects the successful completion of the agentless backup (or restore) operation workload. Subsequently, in one embodiment of the invention, the container runtime re-informs the slave node manager of the new job pod status—i.e., a succeeded status, which may reflect the successful completion of task(s) associated with the agentless backup (or restore) operation workload, and also reflective that the job pod set is currently inactive, however, not yet deleted.

In Step 528, in response to being informed of new job pod set status, the slave node manager re-invokes the container runtime—this time, to disclose the workload metadata aggregated during and for the agentless backup (or restore) operation workload just completed. In response to being re-invoked, the container runtime shares the aggregated workload metadata with the slave node manager. In one embodiment of the invention, workload metadata—respective of an agentless backup (or restore) operation workload—may include, but is not limited to: a storage size (or capacity) consumed on the backup storage system (BSS) by stateful application data and/or state consolidated therein during a backup operation; a completion timestamp encoding a date and/or time reflective of the successful completion of the agentless backup (or restore) operation workload; a time duration reflecting the length of time expended for executing and completing the backup (or restore) operation; a deduplication ratio reflective of the deduplication efficiency of a backup operation; a tenant identifier associated with a tenant; a backup retention period; a backup target identifier; a backup site identifier; and a backup directory pathname.

In Step 530, upon receipt of the workload metadata from the container runtime, the slave node manager issues a backup (or restore) job report. In one embodiment of the invention, the backup (or restore) job report may pertain to details describing the implementation of the agentless backup (or restore) operation workload (obtained in Step 508). Further, the backup (or restore) job report may be directed to the master node interface of the master node (see e.g., FIG. 2), and may at least include the workload metadata for the agentless backup (or restore) operation workload (aggregated in Step 528).

In Step 532, after issuing the backup (or restore) job report, the slave node manager proceeds in removing the cluster and backup persistent volume mounts (created on the selected slave node in Step 508). Subsequently, in Step 534, the slave node manager invokes the container runtime to delete the job pod set (instantiated in Step 520). In one embodiment of the invention, the container runtime responds to the invocation by deleting the aforementioned job pod set.

In Step 536, upon receiving the backup (or restore) job report from the slave node manager of the selected slave node, the master node interface of the master node extracts the workload metadata enclosed therein. The extracted workload metadata may subsequently be relayed to the backup-restore controller, whom had issued the backup (or restore) job request (in Step 500). In one embodiment of the invention, the backup-restore controller, in turn, may record and/or use the workload metadata to perform analytics pertinent to agentless backup (or restore) operations concerning stateful application data and/or state.

Figure 6:
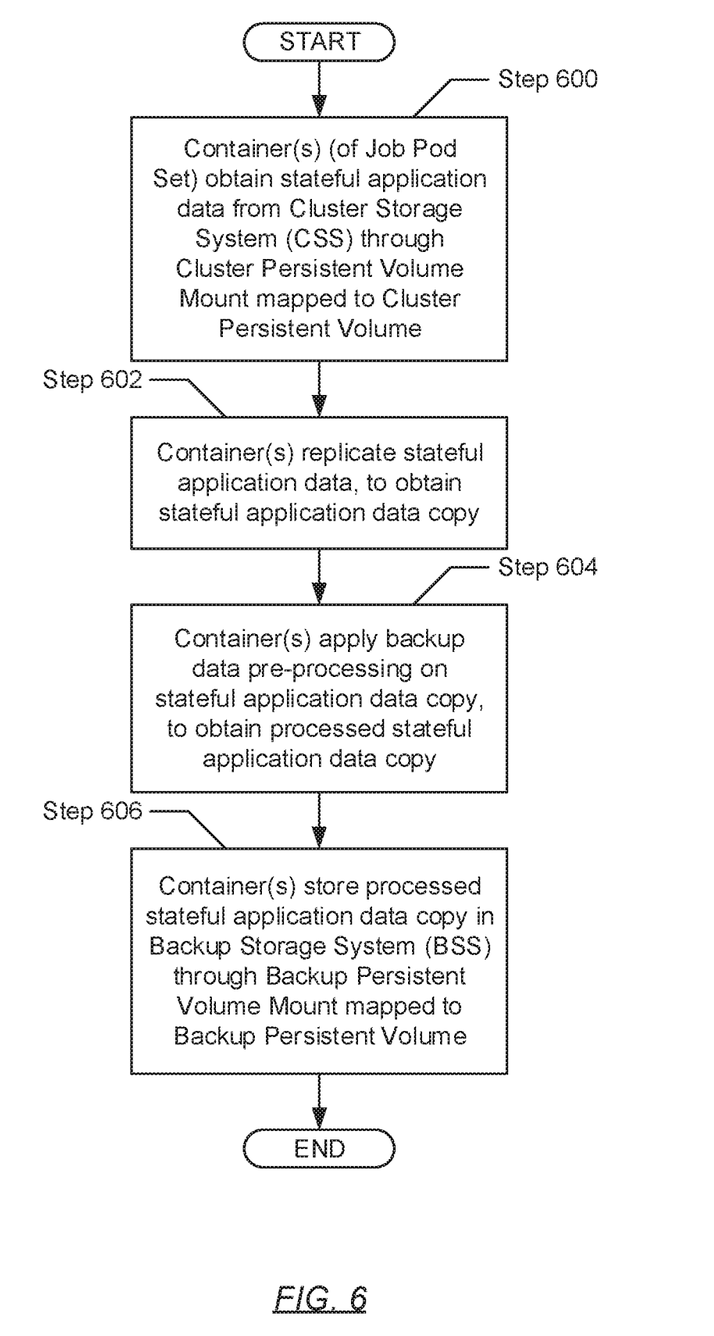
FIG. 6 shows a flowchart describing a method for performing an agentless backup operation in accordance with one or more embodiments of the invention.

FIG. 6 shows a flowchart describing a method for performing an agentless backup operation in accordance with one or more embodiments of the invention. The various steps outlined below may be performed by a slave node of a cluster (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 6, in Step 600, a container (or multiple containers), instantiated within a job pod set (described above) (see e.g., FIG. 3) responsible for executing the agentless backup operation, obtain stateful application data and/or state pertinent to a stateful application. In one embodiment of the invention, the container(s) may obtain the stateful application data and/or state by accessing a cluster persistent volume via a cluster persistent volume mount, and subsequently, reading the stateful application data and/or state therefrom. Further, the cluster persistent volume mount may represent a logically or virtually abstracted object that serves as an interface to the aforementioned cluster persistent volume, which may have been provisioned from a persistent volume pool of the cluster (see e.g., FIG. 1). In turn, the cluster persistent volume may represent a persistent volume (described above) that is backed by, or interfaces with, the cluster storage system (CSS).

In Step 602, the container(s) subsequently replicate the stateful application data and/or state (obtained in Step 600). In one embodiment of the invention, through this replication, the container(s) may obtain copies of the obtained stateful application data and/or state.

In Step 604, following the above-mentioned replication, the container(s) pre-process the obtained stateful application data and/or state copies using one or more backup data pre-processing algorithms. In one embodiment of the invention, each employed backup data pre-processing algorithm may prepare the stateful application data and/or state copies in some manner, prior to consolidation on a backup storage system (BSS), according with the functionality and configuration of the algorithm By way of an example, a backup data pre-processing algorithm may be directed to data deduplication. Data deduplication may refer to a data compression technique directed to eliminating duplicate (or redundant) blocks or chunks of data, thereby reducing storage overhead. By way of another example, a backup data pre-processing algorithm may be directed to data encryption. Further, once the backup data pre-processing algorithm(s) have been applied, the container(s) may obtain processed stateful application data and/or state copies.

In Step 606, after applying the above-mentioned pre-processing, the container(s) store the processed stateful application data and/or state copies (obtained in Step 604) in the BSS. Specifically, in one embodiment of the invention, the container(s) may access a backup persistent volume via a backup persistent volume mount, and subsequently, write the processed stateful application data and/or state copies thereto. Further, the backup persistent volume mount may represent a logically or virtually abstracted object that serves as an interface to the aforementioned backup persistent volume, which may have been provisioned from a persistent volume pool of the cluster (see e.g., FIG. 1). In turn, the backup persistent volume may represent a persistent volume (described above) that is backed by, or interfaces with, the BSS.

Figure 7:
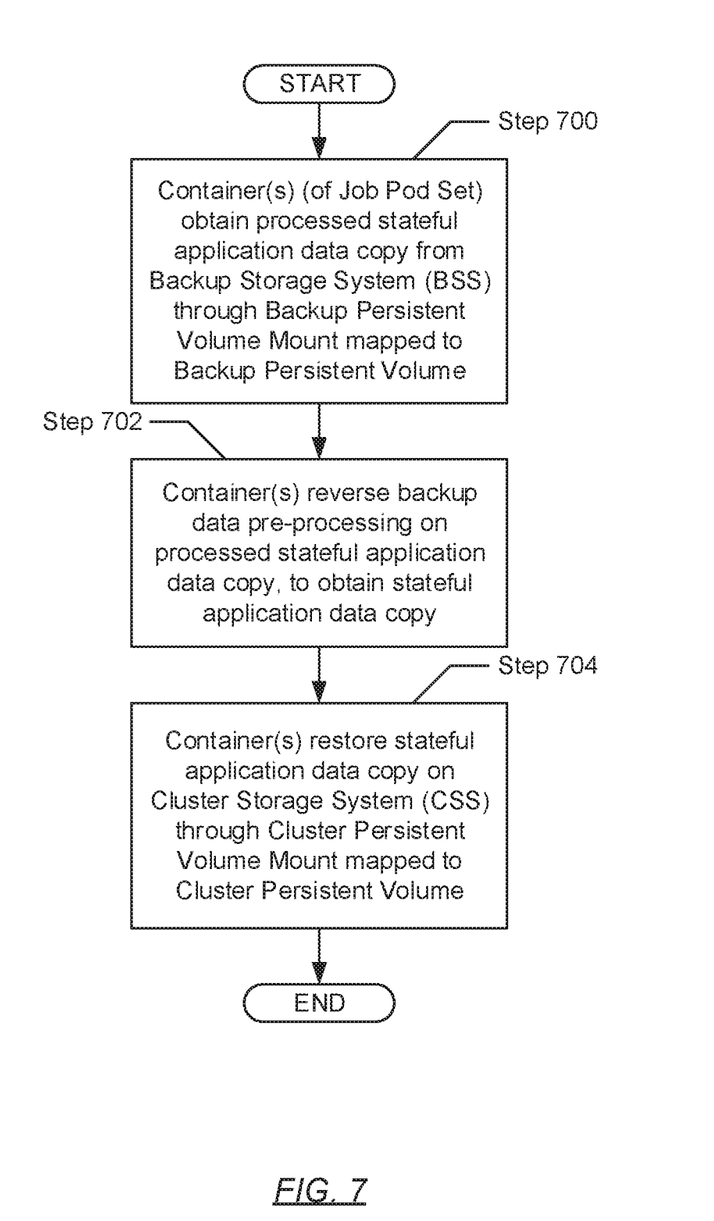
FIG. 7 shows a flowchart describing a method for performing an agentless restore operation in accordance with one or more embodiments of the invention.

FIG. 7 shows a flowchart describing a method for performing an agentless restore operation in accordance with one or more embodiments of the invention. The various steps outlined below may be performed by a slave node of a cluster (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 7, in Step 700, a container (or multiple containers), instantiated within a job pod set (described above) (see e.g., FIG. 3) responsible for executing the agentless restore operation, obtain processed stateful application data and/or state copies pertinent to the recovery of a stateful application. In one embodiment of the invention, the container(s) may obtain the stateful application data and/or state by accessing a backup persistent volume via a backup persistent volume mount, and subsequently, reading the processed stateful application data and/or state copies therefrom. Further, the backup persistent volume mount may represent a logically or virtually abstracted object that serves as an interface to the aforementioned backup persistent volume, which may have been provisioned from a persistent volume pool of the cluster (see e.g., FIG. 1). In turn, the backup persistent volume may represent a persistent volume (described above) that is backed by, or interfaces with, the backup storage system (BSS).

In Step 702, the container(s) subsequently reverse the pre-processing applied during an earlier executed agentless backup operation (see e.g., FIG. 6), which may have yielded the processed stateful application data and/or state copies. In one embodiment of the invention, the aforementioned pre-processing reversal may entail applying one or more backup data post-processing algorithms. In one embodiment of the invention, each employed backup data post-processing algorithm may prepare the processed stateful application data and/or state copies in some manner, prior to their re-integration on a cluster storage system (CSS), according with the functionality and configuration of the algorithm By way of an example, a backup data post-processing algorithm may be directed to reversing data deduplication. Data deduplication may refer to a data compression technique directed to eliminating duplicate (or redundant) blocks or chunks of data, thereby reducing storage overhead. Subsequently, the reversal of data deduplication may entail reverting the deduplicated data and/or state to a prior, decompressed nature. By way of another example, a backup data post-processing algorithm may be directed to reversing data encryption—i.e., data decryption. Further, once the backup data post-processing algorithm(s) have been applied, the container(s) may obtain stateful application data and/or state copies.

In Step 704, after applying the above-mentioned pre-processing reversal (or post-processing), the container(s) restore the stateful application data and/or state copies (obtained in Step 702) on the CSS. Specifically, in one embodiment of the invention, the container(s) may access a cluster persistent volume via a cluster persistent volume mount, and subsequently, write the stateful application data and/or state copies thereto. Further, the cluster persistent volume mount may represent a logically or virtually abstracted object that serves as an interface to the aforementioned cluster persistent volume, which may have been provisioned from a persistent volume pool of the cluster (see e.g., FIG. 1). In turn, the cluster persistent volume may represent a persistent volume (described above) that is backed by, or interfaces with, the CSS.

Figure 8:
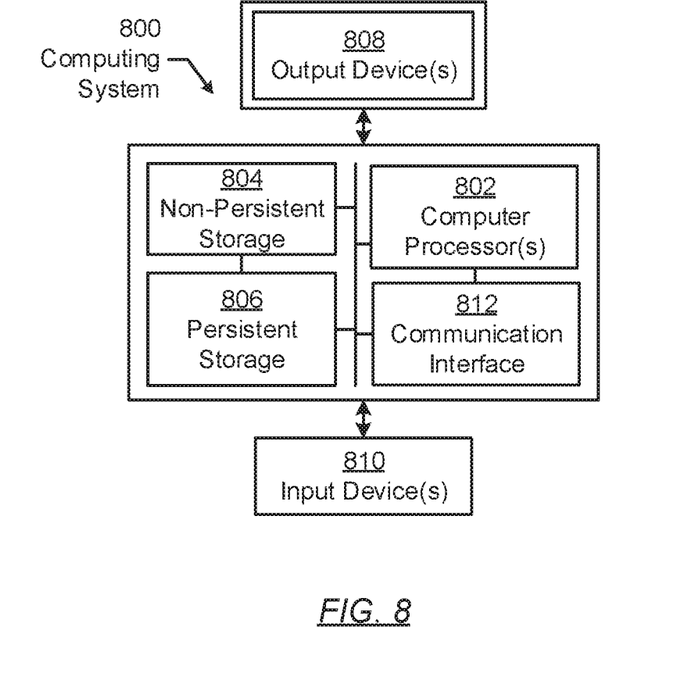
FIG. 8 shows a computing system in accordance with one or more embodiments of the invention.

FIG. 8 shows a computing system in accordance with one or more embodiments of the invention. The computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device. Further, the communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

In one embodiment of the invention, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (504), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for implementing agentless workloads, comprising:
   receiving, by a master node of a cluster, a volume creation request from an administrator client, wherein the volume creation request comprises volume configuration information (VCI);
   in response to the volume creation request:
      generating a backup persistent volume in a persistent volume pool based on a portion of the VCI;
      invoking a backup storage system (BSS) plug-in to connect the backup persistent volume to the BSS using a second portion of the VCI,
      wherein the BSS is operatively connected to the cluster;
   after invoking the BSS plug-in, receiving, by the master slave node, an agentless workload, sought to be implemented, alongside job configuration information;
   selecting, by the master node, a slave node in the cluster to implement the agentless workload;
   sending the agentless workload to the slave node;
   receiving, by the slave node, the agentless workload alongside job configuration information (JCI);
   extracting, from the JCI, a container image identifier (ID);
   retrieving a container image associated with the container image ID; and
   instantiating, to implement the agentless workload, a job pod set comprising a container created from the container image,
   wherein the container executes a set of tasks to complete the agentless workload.

2. The method of claim 1, wherein the agentless workload is a backup operation entailing a stateful application.

3. The method of claim 2, wherein executing the set of tasks, comprises:
   reading stateful application data, pertinent to the stateful application, from a cluster storage system (CSS);
   replicating the stateful application data, to obtain a stateful application data copy;
   pre-processing the stateful application data copy, to obtain a processed stateful application data copy; and
   writing the processed stateful application data copy to the BSS.

4. The method of claim 3, wherein reading from the CSS comprises using a cluster persistent volume mount mapped to a cluster persistent volume, wherein the cluster persistent volume is backed by the CSS.

5. The method of claim 3, wherein writing to the BSS comprises using a backup persistent volume mount mapped to the backup persistent volume.

6. The method of claim 1, wherein the agentless workload is a restore operation entailing a stateful application.

7. The method of claim 6, wherein executing the set of tasks, comprises:
   reading a processed stateful application data copy, pertinent to a recovery of the stateful application, from the BSS;
   post-processing the processed stateful application data copy, to obtain a stateful application data copy; and
   writing the stateful application data copy to a cluster storage system (CSS).

8. A system, comprising:
   a slave node comprising a first computer processor;
   a master node comprising a second computer processor;
   a master node interface executing on the second computer processor, and programmed to:
      receive a volume creation request from an administrator client, wherein the volume creation request comprises volume configuration information (VCI);
      in response to the volume creation request:
         generate a backup persistent volume in a persistent volume pool based on a portion of the VCI;
         invoke a backup storage system (BSS) plug-in, to connect the backup persistent volume to the BSS using a second portion of the VCI,
         wherein the BSS is operatively connected to the cluster;
      after invoking the BSS plug-in, receive an agentless workload, sought to be implemented, alongside job configuration information;

selecting the slave node to implement the agentless workload;

sending the agentless workload to the slave node;

a container runtime executing on the first computer processor, and programmed to:

receive the agentless workload alongside job configuration information (JCI);

extract, from the JCI, a container image identifier (ID);

retrieve a container image associated with the container image ID; and instantiate, to implement the agentless workload, a job pod set comprising a container created from the container image, wherein the container is programmed to execute a set of tasks to complete the agentless workload.

9. The system of claim 8, further comprising:

a container registry operatively connected to the slave node, wherein the container image is retrieved from the container registry.

10. The system of claim 8, further comprising:

a slave node manager also executing on the first computer processor, and operatively connected to the container runtime, wherein the agentless workload and JCI is delegated from the slave node manager.

11. The system of claim 10, wherein the agentless workload and JCI is deployed to the slave node from the master node interface.

12. The system of claim 11, further comprising:

a plurality of slave nodes comprising the slave node, and operatively connected to the master node; and a workload scheduler also executing on the second computer processor, and operatively connected to the master node interface, wherein deployment of the agentless workload and JCI to the slave node, from the plurality of slave nodes, is determined by the workload scheduler using at least a set of job resource requirements (JRR) associated with the agentless workload.

13. The system of claim 12, further comprising:

a cluster comprising the master node, the plurality of slave nodes, and a persistent volume pool, wherein the persistent volume pool comprises a cluster persistent volume operatively connected to at least the slave node, wherein the slave node comprises a cluster persistent volume mount through which the container accesses the cluster persistent volume to execute the set of tasks.

14. The system of claim 13, further comprising:

a cluster storage system (CSS) operatively connected to the cluster, wherein the cluster further comprises a CSS plug-in that maps the cluster persistent volume to the CSS.

15. The system of claim 13, wherein the persistent volume pool further comprises the backup persistent volume operatively connected to at least the slave node, wherein the slave node further comprises a backup persistent volume mount through which the container accesses the backup persistent volume to further execute the set of tasks.

16. The system of claim 15, further comprising:

a backup storage system (BSS) operatively connected to the cluster, wherein the cluster further comprises the BSS plug-in.

* * * * *